United States Patent [19]

Smith

[11] Patent Number: 4,813,731
[45] Date of Patent: Mar. 21, 1989

[54] RELEASE MECHANISM

[76] Inventor: Michael Smith, P.O. Box 907, Cordova, Ak. 99574

[21] Appl. No.: 65,408

[22] Filed: Jun. 23, 1987

[51] Int. Cl.$^4$ .............................................. B66C 1/36
[52] U.S. Cl. .............................. 294/82.33; 294/82.77; 114/252; 24/241 PP
[58] Field of Search ............... 294/82.33, 82.27, 82.30, 294/82.34, 82.35, 82.31, 82.36; 24/241 PS, 241 P, 241 PP, 241 SL, 241 SB, 230.5 R, 232 R; 114/252, 253, 236

[56] References Cited

U.S. PATENT DOCUMENTS 2,328,341  8/1943  Higgins et al. .................... 294/82.27
3,873,146  3/1975  Houshar ........................... 294/82.34

Primary Examiner—James B. Marbert
Attorney, Agent, or Firm—Malin, Haley & McHale

[57] ABSTRACT

An improved cable release mechanism for mounting on the deck of a tow boat, tug or other tow vessel or vehicle comprising a rigid frame connectable to said tow vessel having pivotally connected thereto a pelican hook swingable through at least 180°. The tow strain exerted by the tow cable passes along a line on the plane along which the axis of rotation of the pelican hook lays. As a result, when the device is used for towing, there is no rotational bias exerted on said pelican hook. In one embodiment, means for securing and/or releasing the pelican hook are comprised of a generally triangular shaped release member means having an upper pin and a lower pin positioned on the upper and lower side of the free end of the pelican hook, respectively, wherein when said release member is pivoted toward the release position, the lower pin exerts an upward force on the pelican hook and the upper pin is allowed to clear the way for the pelican hook to swing to the open position thereby releasing the cable. The upward force of the lower pin on the lower surface of the front end of the pelican hook causes the tow strain to be exerted along a line which passes above the axis of rotation of said pelican hook thereby lending a rotational bias to the pelican hook proportional to the tensile load on the tow cable. In a second embodiment, means for securing and/or releasing the pelican hook is comprised of a generally cylindrical member coextensive with the elongate axis of the cable release mechanism, a U-shaped recess adaptable to receive the front end of the pelican hook for securement thereof, said U-shaped recess being movable from a downward opening position through 180° of rotation of said cylindrical member to an upward opening position wherein the free end of the pelican hook is allowed to swing through 180° thereby releasing the tow cable. The U-shaped recess is positioned eccentrically with respect to the elongate axis of said cylindrical member wherein rotation of said cylindrical member causes the pelican hook to move partly upward thereby raising the line of action of the tow cable to pass above and therefore not through the axis of rotation of said pelican hook thereby imparting a rotational or opening bias to said pelican hook proportional to the tensile load carried by the tow cable.

6 Claims, 2 Drawing Sheets

RELEASE MECHANISM

BACKGROUND OF THE INVENTION

1. Field of the Invention

This invention relates to mechanisms for quickly releasing a tow cable from the towing vessel thereof notwithstanding the magnitude of the tensile towing load carried by the tow cable which, in the normal case, tends to lock any towing mechanisms against any releasing movement. More particularly, the invention relates to towing mechanisms having a releasable and securable pelican hook means for retaining the end of a tow cable during towing, wherein during normal towing operation the tensile load in the tow cable passes through the axis of rotation of said pelican hook, and once the pelican hook is caused to move toward a released position the tensile load is caused to pass through a line other than above mentioned, thereby imparting an opening moment or bias to the pelican hook.

2. Description of the Prior Art

Of interest is U.S. Pat. No. 102,067 to Tuttle and Peterson which shows a releasable pelican hook tow cable securement device. The line of force carried by the tow cable of Tuttle, however, at no time passes through the axis of rotation of said hook, and as a result there is a constant opening or pivoting bias carried by the hook and its related structure which may lead to premature fatigue of the mechanism. Also of interest is U.S. Pat. No. 4,540,210 to Smith which shows a cable release mechanism of the remote control variety wherein a pelican hook is released by the linear sliding movement of a keeper ring. Smith also discloses a cable seat connected to a pivotable pelican hook wherein the line of action of the tow cable is deliberately held in a plane generally about the axis of rotation of the pelican hook, which causes there to be a constant moment about the axis of rotation of the pelican hook while the device of Smith is in use. Such a configuration can lead to premature wear and fatigue of the elements.

As in Tuttle, the tensile load carried by the tow cable of Smith does not pass through the axis of rotation of the pelican hook and consequently there is a constant opening bias exerted on the device that may lead to an unwanted and potentially dangerous result should the keeper ring fail and a towed barge be set free to drift.

Improvements to the earliest pelican hook cable securement mechanisms have primarily been directed toward providing release capability to mechanisms under a heavy tensile load carried by the tow cable. Normally the pelican hook had to be released by sharply striking it with a sledge hammer to release the keeper ring. Improvements thereto have included providing remote control (i.e.: hydraulic) means for releasing the pelican hook from engagement with the keeper ring. Such attempts have introduced complicated structure to the devices and the consequent difficulties associated therewith. Further, no devices have been heretofore presented which cause the towing load to be directed through the axis of rotation of the pelican hook whereby there is no dangerous tendency for the pelican hook to rotate away from its containment position during towing operation. When it is desired to release the cable from the cable release mechanism of the instant invention, one merely removes the retaining member from engagement with the end of the pelican hook which motion in and of itself simultaneously causes the tow force to be moved to a position passing above the axis of rotation of said pelican hook wherein the pelican hook is urged open by the moment thus created.

SUMMARY OF THE INVENTION

The instant invention is to a new and non-complicated cable release mechanism comprising a frame means connectable to a towing vessel having associated therewith a pivotable pelican hook movable from a first or closed position through approximately 180° to an open, second or release position. Retaining member means are provided in alternative embodiments for quickly and safely releasing said pelican hook from its closed position even while the tow cable is exerting a towing force on the mechanism. During normal towing, the tow cable force is caused to pass through a line coinciding with, and generally perpendicular to, the axis of rotation of said pelican hook.

In a first embodiment, the release member means is comprised of a generally triangular shaped member having a pair of parallel opposed planar members connected by a plurality of spanning pin members generally perpendicular to said planar members. A first spanning pin is connected between said frame means and said release member means and allows for rotational motion of said release member means relative to said frame means. A second spanning or upper pin means is disposed above the free end of the pelican hook and retains said pelican hook against rotational movement toward an open position. A third spanning member means or lower pin means is disposed below said free end of said pelican hook and it generally offset with respect to said upper pin means (i.e., is not vertically below said upper pin means) and upon rotation about said spanning pin said lower pin is urged in a generally upward direction against the underside of the free end of said pelican hook thereby causing said pelican hook to rotate toward the release position which further causes the cable tow force to move from a first position passing through said axis of rotation of said pelican hook to a second position passing above said axis of rotation which thereby lends a rotational bias to said pelican hook forcing the pelican hook toward the open position thereby releasing the tow cable therefrom.

A fourth spanning member means may be supplied in the form of a fourth pin member means connected to a fifth pin means which is connected at right angles to said fourth pin member means and to said frame means. The fifth pin means may be a pivotable link with a coaxial compression spring associated therewith for exerting a compressive force on said fourth and fifth pins respectively. The link and spring combination acts to retain said release member means in either the open or closed position, depending upon the rotation thereof, by cam action.

In a second embodiment the release member means is comprised of an elongated cylinder having an elongate axis coinciding generally with the elongate axis of the frame means. Said retaining member means has a U-shaped recess disposed in one of its ends adapted to receive the free end of the pelican hook in releasable locking relation which is rotatable from a downwardly opening position (locked position) through 180° to an upwardly opening position (hook release position). The U-shaped recess is positioned eccentrically with respect to the elongate axis of the retaining member means of the second embodiment such that when said retaining member means is rotated the U-shaped recess acts by way of cam action to urge the free end of the pelican hook upward. The upward movement of the free end of the pelican hook causes the tow cable to shift in a generally upward direction on the lower end of the pelican hook thereby transferring the line of action above the axis of rotation of the pelican hook.

It can therefore be seen that the instant invention represents an improvement over the prior art by providing a cable release mechanism of the type having a rotatable and securable pelican hook wherein the tensile load borne by the tow cable is passed directly through the axis of rotation of said pelican hook. The absence of any biasing moments in the above mentioned configuration results in a stable structure unlike any heretobefore proposed.

It is therefore a principal object of the present invention to provide a tow cable release mechanism exhibiting a high degree of statical determinacy.

It is a further object of the present invention to provide a tow cable release mechanism employing a pelican hook configuration wherein the tow strain is directed along a line which passes through the axis of rotation of said pelican hook.

It is a still further object of the present invention to provide a tow cable quick release mechanism wherein the activation of a release member means causes the line of action of the tow cable force to be directed along a line above the axis of rotation of the pelican hook.

It is a still further object of the present invention to provide a tow cable release mechanism of the sort above described wherein a tow cable can be released from securement to said mechanism even when there is a high tensile load borne by said tow cable.

In accordance with these and other objects which will be apparent hereinafter, the instant invention will now be described with particular reference to the accompanying drawings.

DETAILED DESCRIPTION OF THE PREFERRED EMBODIMENT

Figure 1:
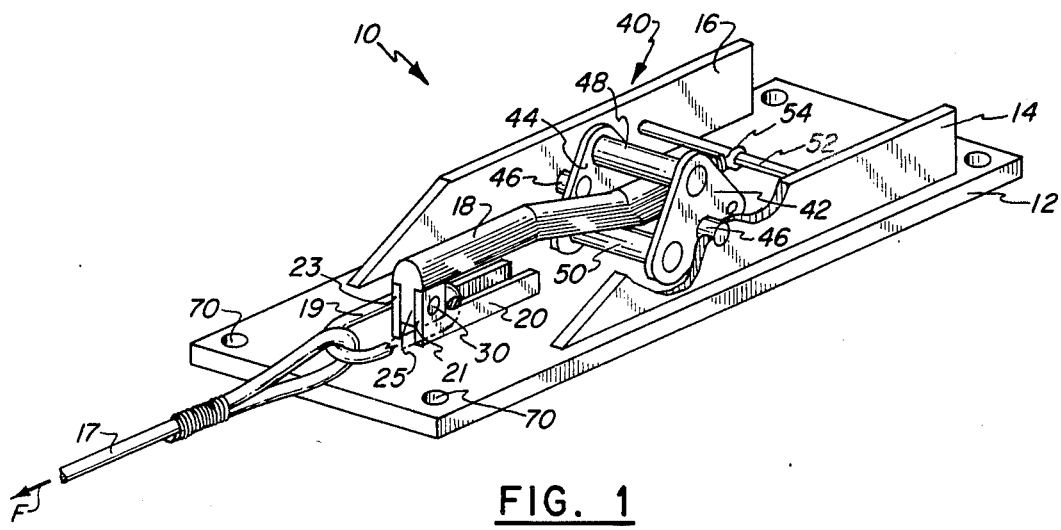
FIG. 1 is a perspective of one embodiment of the instant invention.
Figure 2:
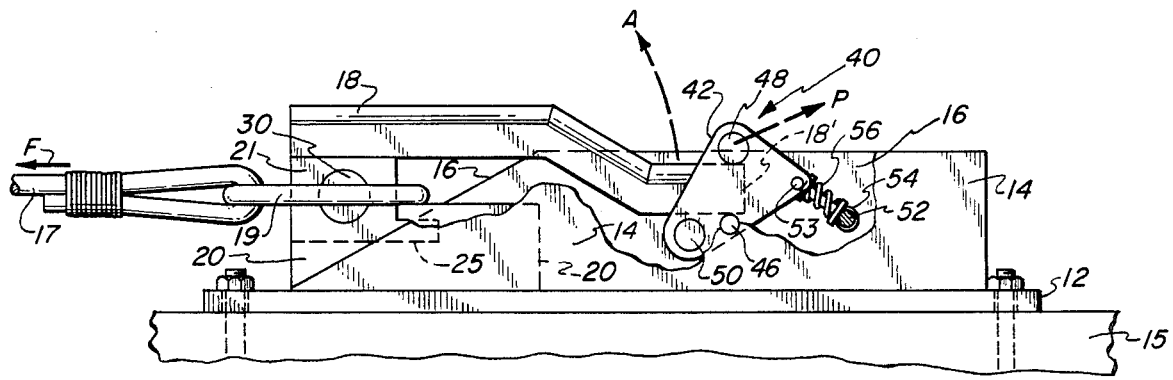
FIG. 2 is an elevational view of the device in the closed position of FIG. 1.
Figure 3:
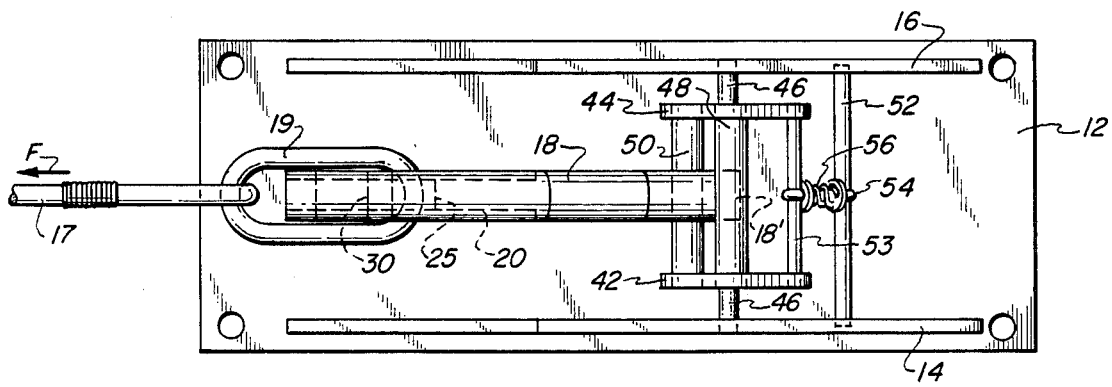
FIG. 3 is a plan view of the device in the closed position.

Turning now to the drawings, FIGS. 1 through 3 show a first embodiment of the cable release mechanism 10 comprised of a rigid base means 12 connectable to a towing device such as a tug or other tow vessel 15, a pair of vertically extending side frame members 14 and 16, and a pelican hook rotatable about pin 30. Pin 30 is fixed in hinge pin housing 20 and allows the pelican hook 18 to rotate through 180° from a first or closed position shown in the drawings to an open or cable release position (not shown) the direction of rotation being indicated by arrow A in FIG. 2. Pelican hook release member means 40 holds the free end 18' of pelican hook 18 in a closed or fixed position to be set forth more fully hereinafter, until such time as it is desired to release cable 17 from securement to the cable release mechanism. As is best seen in FIGS. 1 and 2, cable 17 may have a looped end 19 which is dropped down over the free end of pelican hook 18 when the hook is in the release or open position and placed around the raised flanges 21 and 23, respectively, of hinge pin housing 20 and depending flange 25 of hook 18. The bulk of the towing force F borne as a tensile load in cable 17 may be exerted at the point of contact of looped end 19 with said flanges 21, 23 and 25. Preferably, however, force F is borne by flange 25 alone so as to keep friction to a minimum when hook 18 is releasing cable 17. The direction of the force vector represented by F passes through the axis of rotation of pin 30, which is also the axis of rotation of hook 18. The result of this configuration is that there is never a moment exerted upon hook 18 or pin 30 when hook 18 is secured in the closed position by release member means 40.

Release member means 40 is comprised, in a first embodiment, of a pair of generally triangular parallel opposed planar members 42 and 44 connected by a plurality of spanning pin member means which are generally perpendicular to said planar members. First spanning pin 46 is connected within aligned recesses in side frames 14 and 16, respectively, and is also disposed through aligned openings in members 42 and 44. First spanning pin 46 allows for rotation of release member means 40 with respect to base means 12. Second spanning or upper pin means 48 is disposed above the free end of pelican hook 18 and retains said hook 18 against movement toward the open or release position. The third spanning or lower pin means 50 is disposed below the free end of hook 18, is generally offset with respect to said upper pin means 48 (i.e.: is not vertically below said upper pin means) and upon rotation of release member means about said first spanning pin 46, as for instance by a pulling force exerted in the direction of arrow P of FIG. 2, said lower pin 50 is urged in a generally upward direction against the underside of the free end 18' of hook 18 thereby causing said pelican hook to rotate toward the release position (in the direction of arrow A of FIG. 2) which further causes upper pin 48 to rotate to the right in FIG. 2 and thereby clear the free end of hook 18 allowing said hook 18 to move further toward the release position which simultaneously causes force F direction to a position above the axis of rotation of pin 30 lending a biasing moment to hook 18 about pin 30 and thereafter forcing hook 18 to open automatically, releasing cable 17 therefrom.

Release member means position locking feature, which may be called a release member means positioning means, may be achieved by employing pivot pin 52 disposed in aligned recesses provided in side frames 14 and 16 rotatably mounted upon which is a relatively short member 54 having disposed thereon in coaxial relation a compression spring 56 which abuts against a pin 53 disposed in aligned recesses in planar members 42 and 44, respectively. It can therefore be seen that when release member means 40 is in the closed position shown in FIGS. 1 through 3, compression spring 56 acts to maintain same position. When release member means 40 is in the open or released position (not shown) member 54 is caused to rotate in a counter-clockwise direction to that shown in FIG. 2 about pin 52 whereafter compression spring 56 acts to maintain release member means 40 in that released position. As best seen in FIG. 2, when release member means 40 rotates about pin 46, pin 50 pushes in a generally upward direction on the lower free end 18' of hook 18 and simultaneously pin 48 moves to the right to clear free end 18' of hook 18 whereas to allow the free end 18' to rotate to the open position.

FIGS. 4 through 8 show a cable release mechanism 10 similar to that shown in FIGS. 1 through 3 wherein cable release member means 40 is comprised of a generally cylindrical elongated member 62 having a first end and a second end, said cylindrical member being rotatably connected to frame means 12, 14' and 16' by way of, preferably but not by way of limitation, bearing housings 64 and 66 which are rigidly connected to frame means 12 and side frame members 14' and 16'. Release member 62 is disposed generally along the elongate axis of the cable release mechanism 10.

Figure 4:
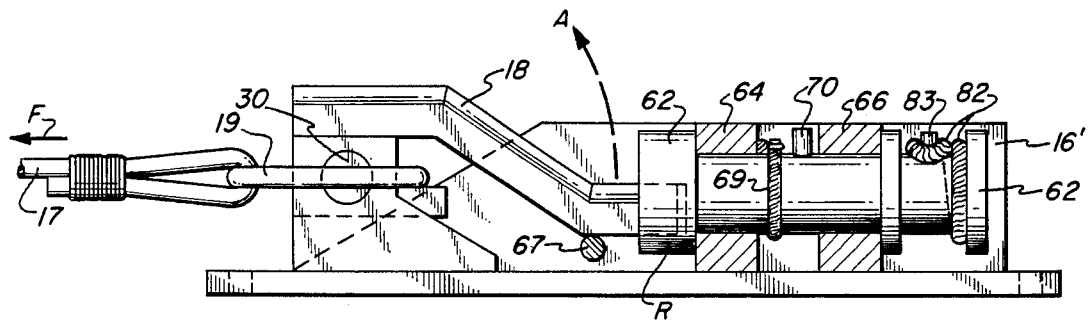
FIG. 4 is an elevational view of a second embodiment of the invention.
Figure 5:
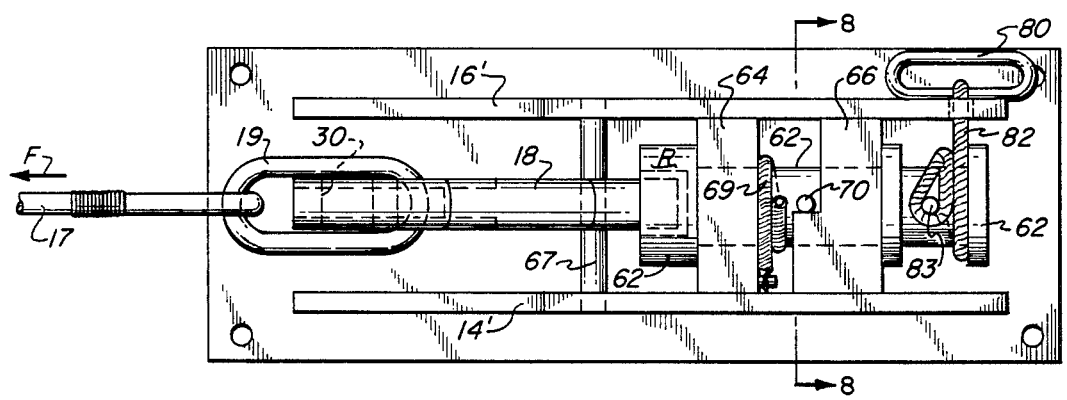
FIG. 5 is a top view of the embodiment of FIG. 4.
Figure 6:
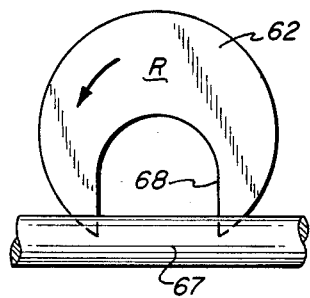
FIG. 6 is an end view showing detail of the U-shaped pelican hook free end receiving recess in the downward or closed position.
Figure 7:
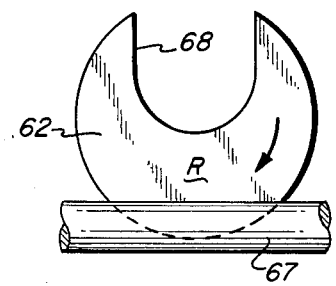
FIG. 7 shows the U-shaped recess of FIG. 6 in the open or released position.
Figure 8:
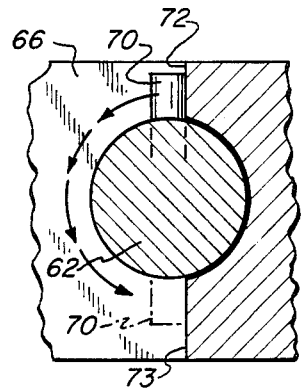
FIG. 8 shows detail of an embodiment of a rotational stop means for the embodiment of FIG. 4.

Release member 62 is rotatable by any convenient means, and may indeed be rotated as shown in FIG. 5 by the structure of a pull handle 80 connected to a flexible cable 82 which is wound around a portion of member 62 so that when handle 80 is pulled outwardly, cable 82 feeds out through an aperture in side frame 16' causing rotation of member 62. It can be seen that a rotation stop member 70 may be comprised of a projection connected to member 62 which mate to abut against portions 72 and 73 of side frame 14'. Biasing member 69, which may be a wound spring, as shown in FIG. 5, connected between side frame 14' and member 62 for urging member 62 to remain in the closed position (to be set forth more fully below) wherein projection 70 is in abutment with member 72. It can therefore be seen that when handle 80 is pulled outwardly, cable 82 feeds outward causing the rotation of member 62 by virtue of the interconnection of cable 82 with pin 83, as handle 80 is released proportional biasing means 69 causes member 62 to rotate back to the closed position only so far as projection 70 and abutment member 72 shall allow. As can be seen in FIGS. 5 and 8, when projection 70 is in the position shown therein, U-shaped recess 68 is in the downward opening or closed position of FIG. 6. Disposed in one end of member 62 is a U-shaped recess portion 68 adaptable to receive the free end of the pelican hook 18. As seen in FIG. 4, a stop pin means 67 is positioned in aligned apertures in side frames 14' and 16' and acts as a bottom stop against downward rotation of the free end of hook 18 beyond the position shown in FIG. 4. To release the eye 19 from hook 18 in the second illustrated embodiment, handle 80 is pulled outwardly causing member 62 to rotate which causes U-shaped recess 68 to move from the downward opening to the upward open position thereby allowing hook 18 to rotate through 180° in the direction of arrow A shown in FIG. 4, releasing looped end 19 of tow cable 17. It should be noted that U-shaped recess 68 is eccentricly associated with respect to the elongate axis of rotation of member 62 so that as said member is rotated from the closed to the open position, or vice versa, U-shaped recess moves in cam-like fashion, as the recess moves from the closed position to the open position, hook 18 is moved slightly upward causing the line of force carried by tow cable 17 to move above the axis of rotation, creates a moment about pin 30 which causes further rotation of hook 18 to the full open position.

It is readily apparent that a novel feature of the instant invention is the carrying of the tow cable load across the axis of rotation of pelican hook 18 thereby eliminating any torquing bias while the cable release mechanism is acting in the towing operation.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. In a tow cable release mechanism for quickly and safely releasing a tow cable from connection to a towing or towed vessel, comprising:

base means connectable to said towed or towing vessel;

a hinge member rigidly connected to said base means;

a pelican hook member pivotably connected to said hinge member for movement between a closed or an open or cable release position;

cable receiving means connected to said pelican hook for maintaining the force vector borne by said tow cable in a plane substantially co-extensive with the axis of pivot of the pelican hook;

pelican hook release member means releasably connectable to the free end of said pelican hook;

said release member means being pivotably connected to said base means;

said release member means being movable between a locked position and a release position wherein when said release member means is in the locked position the cable receiving means holds the tow cable in a plane substantially co-extensive with the axis of pivot of the pelican hook, and further wherein when said release member means is moved toward and into the release position the tow cable is caused to be moved to a horizontal plane above the horizontal plane wherein lies the axis of pivot of the pelican hook;

said release member means is comprised of a pair of opposed generally vertical disposed planar members connected by a plurality of spanning pin members connected at right angles thereto, there being a first spanning pin member about which said release member means rotates, said first spanning pin member being rotatably associated with said base means, there being an upper spanning pin member associated with the upper surface of the free end of said pelican hook, there being a lower spanning pin member associated with the lower surface of the free end of said pelican hook;

wherein when said release member means is rotated from the locked position toward and into the locked position, the lower spanning pin member urges upwardly against the lower surface of the free end of the pelican hook and simultaneously the upper pin is moved out and away from the outermost edge of the free end of the pelican hook, the upward urging of the lower spanning pin member causing the force vector borne by the tow cable to be moved to a position generally above the plane wherein lays the axis of pivot of the pelican hook thereby causing the tow cable to exert a torque about the axis of pivot of the pelican hook resulting in the forced opening of the pelican hook to release the tow cable without substantial effort by the user.

2. The tow cable release mechanism of claim 1, further comprising:

release member means positioning means connected to said release member means for positioning said release member means in either the locked or released position, depending upon selection thereof by the user of the device.

3. The tow cable release mechanism of claim 2, wherein:

said release member means positioning means is comprised of a pivot pin rotatably connected between said vertically disposed planar members and connected to said release member means by way of a link and compression spring disposed coaxially about said link, said spring acting to urge said release member means in either the closed or the release position depending upon orientation thereof.

4. In a tow cable release mechanism for quickly and safely releasing a tow cable from connection to a towing or towed vessel, comprising:

base means connectable to said towed or towing vessel;

a hinge member rigidly connected to said base means;

a pelican hook member pivotably connected to said hinge member for movement between a closed and an open or cable release position;

cable receiving means connected to said pelican hook for maintaining the force vector borne by said tow cable in a plane substantially co-extensive with the axis of pivot of the pelican hook;

pelican hook release member means releasably connectable to the free end of said pelican hook;

said release member means being pivotably connected to said base means;

said release member means being movable between a locked position and a release position wherein when said release member means is in the locked position the cable receiving means holds the tow cable in a plane substantially co-extensive with the axis of pivot of the pelican hook, and further wherein when said release member means is moved toward and into the release position the tow cable is caused to be moved to a horizontal plane above the horizontal plane wherein lies the axis of pivot of the pelican hook;

wherein the release member means is comprised of a generally elongated cylindrical member adapted to rotate along the elongated axis of the base means in generally co-extensive relation with the respect to the tow cable release mechanism;

said cylindrical member having disposed therein a generally U-shaped recess adapted to receive the free end of said pelican hook, said U-shaped opening movable between a first downwardly opening position through 180° of rotation of said cylindrical member to an upwardly opening or hook releasing position.

5. The tow cable release mechanism of claim 4 further comprising release member means rotating means and further comprising release member means return means.

6. The tow cable release mechanism of claim 5 wherein said release member means rotating means is a handle connected to a flexible cable, said cable being connected to said cylindrical member wherein when said handle is pulled away from said tow cable release mechanism at a right angle to the direction of the force vector borne by the tow cable, the connection of the cable with the cylindrical member causes said cylindrical member to rotate the U-shaped recess from the closed to the open position when the handle is pulled in a direction away from the said cylindrical member, said release member means return means causing said U-shaped recess to be rotated from the open position to the closed position when said handle is released.

* * * * *